L. & J. SYKES.
Nut-Locks.

No. 150,801. Patented May 12, 1874.

WITNESSES:
Chas. Nida

INVENTOR:
L. Sykes
J. Sykes
BY
ATTORNEYS.

UNITED STATES PATENT OFFICE.

LOFTUS SYKES AND JOSEPH SYKES, OF PHILADELPHIA, PENNSYLVANIA.

IMPROVEMENT IN NUT-LOCKS.

Specification forming part of Letters Patent No. 150,801, dated May 12, 1874; application filed January 31, 1874.

*To all whom it may concern:*

Be it known that we, LOFTUS SYKES and JOSEPH SYKES, of Philadelphia, in the county of Philadelphia and State of Pennsylvania, have invented a new and useful Improvement in Lock-Nuts, of which the following is a specification:

This invention relates to improved means for preventing the nuts of bolts from turning off by means of jar or concussion, more especially designed for fish-plates at rail-joints, but not confined exclusively thereto.

In this example of our invention the improvement is shown applied to the fish-plates of a rail-joint.

Figure 1:
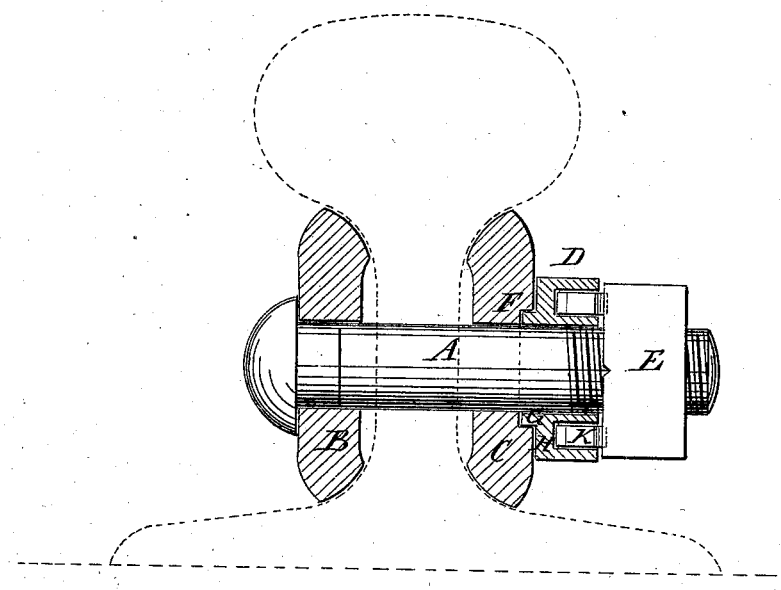
Figure 2:
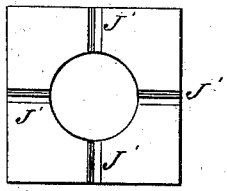
Figure 3:
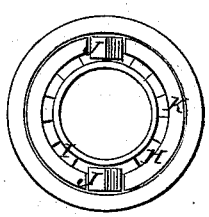
Figure 4:
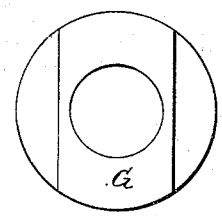
Figure 5:
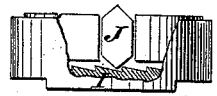
Figure 6:
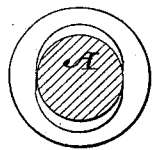

Figure 1 is a vertical section, showing the whole arrangement, the rail being seen in dotted lines. Fig. 2 is a view of the under side of the nut, showing four (more or less) grooves radiating from the center thereof. Fig. 3 is a top view of the nut, showing the ratchet-teeth and pawl-block. Fig. 4 is the under side of the washer. Fig. 5 is a side view of the washer, showing the ratchet and blocks in section. Fig. 6 represents the bolt-hole through the head fish plate, which is of an oval form, to prevent the bolt from turning.

Similar letters of reference indicate corresponding parts.

A represents the bolt. B is the head fish-plate on one side of the rail. C is the fish-plate on the opposite side of the rail. D is the washer, and E is the nut. The fish-plate C is rolled with a groove, F, and the washer is made with a rib, G, which fits into the groove, as seen in Fig. 1. The opposite side of the washer is made with a deep groove, H, at the bottom of which groove is a series of ratchet-teeth, I. J are ratchet-blocks, with V-shaped ends, which stand upright in the groove, as represented in Fig. 5, with their opposite ends projecting from the surfaces of the washer to engage with the grooves J' on the under side of the nut E. K represents strips of rubber between the blocks, which project from the face of the washer. These strips hold the blocks in place, and act as a spring against the nut, and prevent the nut and blocks from working back on the ratchet.

When the nut is screwed down, the blocks are tightly compressed between the ends of the rubber, one end of the blocks being in the V-shaped grooves J' of the nut. The other ends are held by the ratchet-teeth, which effectually prevents a backward movement of the nut; and the washer being fast in the groove of the fish-plate (or other article to be fastened) the connection is rendered permanent and safe.

This improvement may be applied to all the purposes for which it is adapted.

We are aware washers have been heretofore provided with teeth or notches for engagement of springs attached to their nuts, and do not claim such construction or combination.

Having thus described our invention, we claim as new and desire to secure by Letters Patent—

The washer D, having an annular-toothed groove, and connected with the fish-plate or other base, so as to prevent its rotation, and the beveled blocks J, elastic strips K, and nut E, grooved on the under side, combined as shown and described.

LOFTUS SYKES.
JOSEPH SYKES.

Witnesses:
O. A. T. EGGLETON,
B. P. SPARKS.